United States Patent

Wang

(10) Patent No.: US 8,750,724 B2
(45) Date of Patent: Jun. 10, 2014

(54) ELECTRONIC DISPERSION CORRECTION CIRCUIT FOR OPTICAL TRANSMISSION SYSTEM

(75) Inventor: Jun Wang, Warrington, PA (US)

(73) Assignee: Motorola Mobility LLC, Chicago, IL (US)

( * ) Notice: Subject to any disclaimer, the term of this patent is extended or adjusted under 35 U.S.C. 154(b) by 79 days.

(21) Appl. No.: 13/467,353

(22) Filed: May 9, 2012

(65) Prior Publication Data

US 2013/0302038 A1    Nov. 14, 2013

(51) Int. Cl.
*H04B 10/50* (2013.01)

(52) U.S. Cl.
USPC ............................................. 398/193

(58) Field of Classification Search
USPC .................................. 398/193–194
See application file for complete search history.

(56) References Cited

U.S. PATENT DOCUMENTS

| | | | |
|---|---|---|---|
| 4,354,276 A * | 10/1982 | Karabinis | 455/139 |
| 5,115,440 A | 5/1992 | Gysel | |
| 5,146,192 A | 9/1992 | Kondo et al. | |
| 5,302,922 A | 4/1994 | Heidemann et al. | |
| 5,321,710 A | 6/1994 | Cornish | |
| 5,378,937 A | 1/1995 | Heidemann et al. | |
| 5,798,854 A | 8/1998 | Blauvelt et al. | |
| 5,930,696 A | 7/1999 | Tzuang et al. | |
| 6,107,877 A | 8/2000 | Miguelez et al. | |
| 6,133,790 A | 10/2000 | Zhou | |
| 6,288,814 B1 | 9/2001 | Blauvelt | |
| 6,519,374 B1 | 2/2003 | Stook | |
| 6,549,316 B2 | 4/2003 | Blauvelt | |
| 6,577,177 B2 | 6/2003 | Zhou et al. | |
| 6,587,243 B1 | 7/2003 | Zhou | |
| 6,865,199 B2 | 3/2005 | Miguelez et al. | |
| 6,985,020 B2 | 1/2006 | Zhou | |
| 7,057,474 B2 | 6/2006 | Miller | |
| 7,271,948 B1 | 9/2007 | Wang et al. | |
| 7,606,502 B2 | 10/2009 | Zhou | |
| 7,792,165 B2 | 9/2010 | Khalouf et al. | |
| 7,809,282 B2 | 10/2010 | Zhou | |
| 7,920,795 B2 | 4/2011 | Wang et al. | |
| 2002/0063930 A1 | 5/2002 | Blauvelt | |
| 2003/0015697 A1 | 1/2003 | Brophy et al. | |
| 2003/0016415 A1 | 1/2003 | Jun | |
| 2004/0056720 A1 | 3/2004 | Jansen et al. | |
| 2007/0030087 A1 | 2/2007 | Perry et al. | |
| 2007/0264027 A1 | 11/2007 | Zhou | |
| 2007/0297803 A1 | 12/2007 | Peral | |
| 2008/0292315 A1 | 11/2008 | Zhou | |
| 2009/0245309 A1 | 10/2009 | Khalouf et al. | |
| 2009/0310967 A1 | 12/2009 | Wang et al. | |
| 2011/0150484 A1 | 6/2011 | Wang | |
| 2011/0262144 A1* | 10/2011 | Ishaug | 398/115 |

* cited by examiner

*Primary Examiner* — Leslie Pascal

(57) ABSTRACT

A dispersion correction circuit is provided for use with an input driving signal. The dispersion correction circuit includes an input portion, an output portion and a filter portion. The input portion is arranged to receive the input driving signal. The output portion can output an output signal based on the input driving signal. The filter portion is disposed between the input portion and the output portion. The filter portion includes a varactor, a DC bias portion, and a transformer. The DC bias portion provides a DC bias to the varactor.

15 Claims, 3 Drawing Sheets

ELECTRONIC DISPERSION CORRECTION CIRCUIT FOR OPTICAL TRANSMISSION SYSTEM

CROSS-REFERENCE TO RELATED APPLICATION

Related subject matter is disclosed in the following patent application, which is commonly owned and co-pending with the present application, and the entire contents of which are hereby incorporated by reference: U.S. application Ser. No. 13/467,389, filed herewith, entitled "ELECTRONIC DISPERSION CORRECTION CIRCUIT FOR OPTICAL TRANSMISSION SYSTEM".

BACKGROUND

In conventional Cable Television (CATV) transmission systems, the conventional technology trend is to transmit signals optically via 1550 nm. The selection of the 1550 nm wavelength window is due to a lower fiber attenuation loss than in other alternatives. Furthermore, the availability of optical amplifiers in the 1550 nm window enables configuring systems with longer lengths of optical communication waveguides. However, in the 1550 nm wavelength window, the dispersion associated with optical waveguides results in distorted signals. For example, the interaction of the laser chirp, a frequency increase or decrease over a period of time, and fiber dispersion produces huge second order distortion and associated noise in CATV transmission systems and results in the inability to provide a directly modulated laser over the past decade for optical communication systems. The current technology used for 1550 nm transmitters is external modulation (EM) using external modulators. Furthermore, external modulation using external modulators is expensive and complex.

Recent changes associated with CATV system requirements, for example, smaller number of analog channels and more Quadrature Amplitude Modulation (QAM) channels, and Distributed Feedback (DFB) laser improvement, for example, smaller laser chirp parameter and better laser linearity results in the capability to use directly modulated laser transmitters for transmission of CATV signals in the 1550 nm window with the aid of dispersion correction. Dispersion correction is needed to correct the distortion caused by fiber dispersion correction.

There are basically two types of dispersion correction technologies, one being optical dispersion correction and the other is electronic dispersion correction. Optical dispersion technologies are normally expensive and optically lossy. Some optical dispersion correction technologies may also incur signal degradations, such as filter band limitation and optical non-linearity. In contrast to optical dispersion correction, electronic dispersion technology does not suffer from the issues as described above. Furthermore, electronic dispersion correction is cheaper to implement than optical dispersion correction.

While conventional electronic dispersion correction technology has advantages over the optical one, which can include low cost, being optically lossless and tunable, it also has disadvantages, such as limitations associated with dispersion correction, with respect to limiting the number of analog channels capable of transmission and reduced transmission waveguide distance.

BRIEF SUMMARY OF THE DRAWINGS

The accompanying drawings, which are incorporated in and form a part of the specification, illustrate exemplary embodiments and, together with the description, serve to explain the principles thereof. In the drawings.

DETAILED DESCRIPTION

Improved system and methods for dispersion correction associated with optical communications are provided. Additional advantages and novel features are set forth in part in the description which follows, and in part will become apparent to those skilled in the art upon examination of the following, or may be learned by practice of an embodiment.

In accordance with embodiments, dispersion correction circuits are presented for improving dispersion correction associated with optical communications.

In accordance with an illustrative embodiment, a dispersion correction circuit is provided for use with an input driving signal. The dispersion correction circuit includes an input portion, an output portion and a filter portion. The input portion is arranged to receive the input driving signal. The output portion can output an output signal based on the input driving signal. The filter portion is disposed between the input portion and the output portion. The filter portion includes a varactor, a DC bias portion and transformer. The DC bias portion provides a DC bias to the varactor.

In some embodiments, the DC bias portion includes an inductor. In further embodiments, the input portion includes an inductor. In still further embodiments, the input portion includes an inductor.

Figure 1:
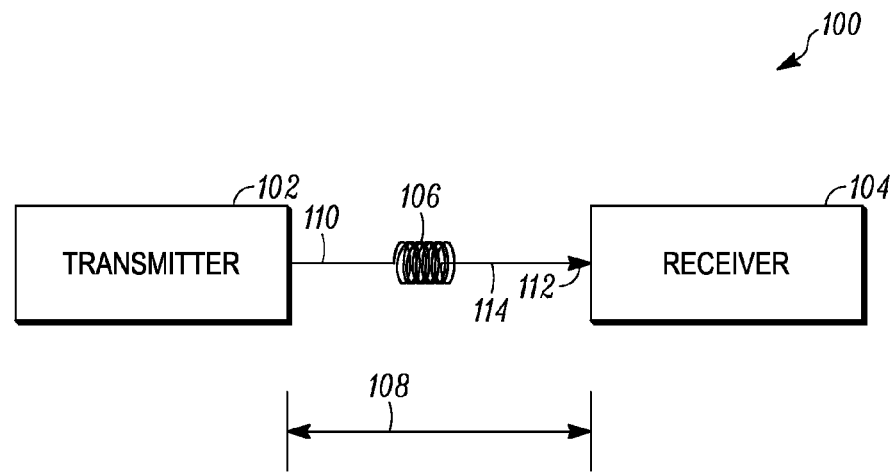
FIG. 1 is an example optical communication system, in accordance with an embodiment.

FIG. 1 is an example optical communication system 100, in accordance with an embodiment.

Optical communication system 100 includes a transmitter 102, a receiver 104 and an optical communication channel 106.

Transmitter 102 optically transmits information through optical communication channel 106 to receiver 104.

Non-limiting examples of configurations for optical communication channel 106 include optical waveguides and optical fibers.

Transmitter 102 and receiver 104 are separated by a distance 108. A signal transmitted by transmitter 102 exits transmitter 102 at a location 110 and is received by receiver 104 at a location 112. A location 114 represents the midway point between transmitter 102 and receiver 104.

In operation, information is transmitted by transmitter 102, information then traverses optical communication channel and is then received by receiver 104.

FIG. 1 is an example optical communication system where information is communicated from a transmitter to a receiver. Transmitter 102 will be described in further detail with reference to FIGS. 2-3 below.

Figure 2:
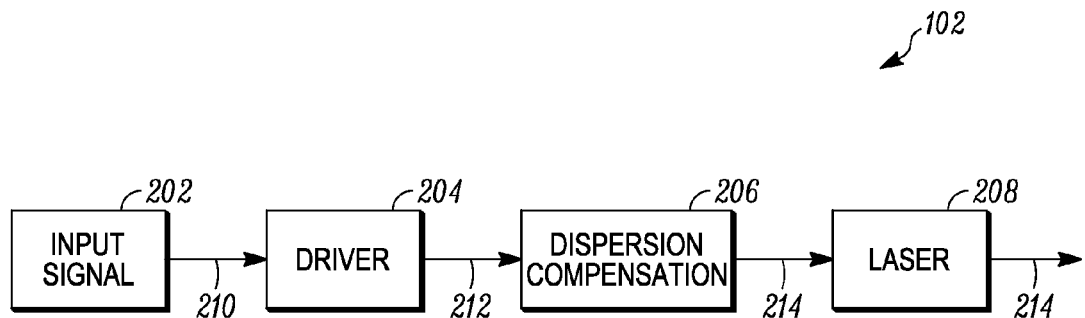
FIG. 2 illustrates in more detail example transmitter as described with reference to FIG. 1, in accordance with an embodiment.

FIG. 2 illustrates in more detail example transmitter 102 as described with reference to FIG. 1, in accordance with an embodiment.

Transmitter 102 includes an input signal provider 202, a driving signal provider 204, a dispersion correction circuit 206 and a laser 208.

Driving signal provider 204 receives information from input signal provider 202 via a communication channel 210. Dispersion correction circuit 206 receives information from driving signal provider 204 via a signal 212. Laser 208 receives information from dispersion correction circuit 206 via a signal 214. Laser 208 provides information to external entities (not shown) via a communication channel 216.

Input signal provider 202 provides information for transmission to a receiver. Driving signal provider 204 receives and processes information such that it may be further processed for transmission. Dispersion correction circuit 206 receives information and processes the information for dispersion correction. Laser 208 receives information and generates a corresponding light signal.

FIG. 2 illustrates in more detail example the transmitter as described with reference to FIG. 1 where information is converted and processed for performing dispersion correction. Dispersion correction circuit 206 will be described in further detail with reference to FIG. 3.

Figure 3:
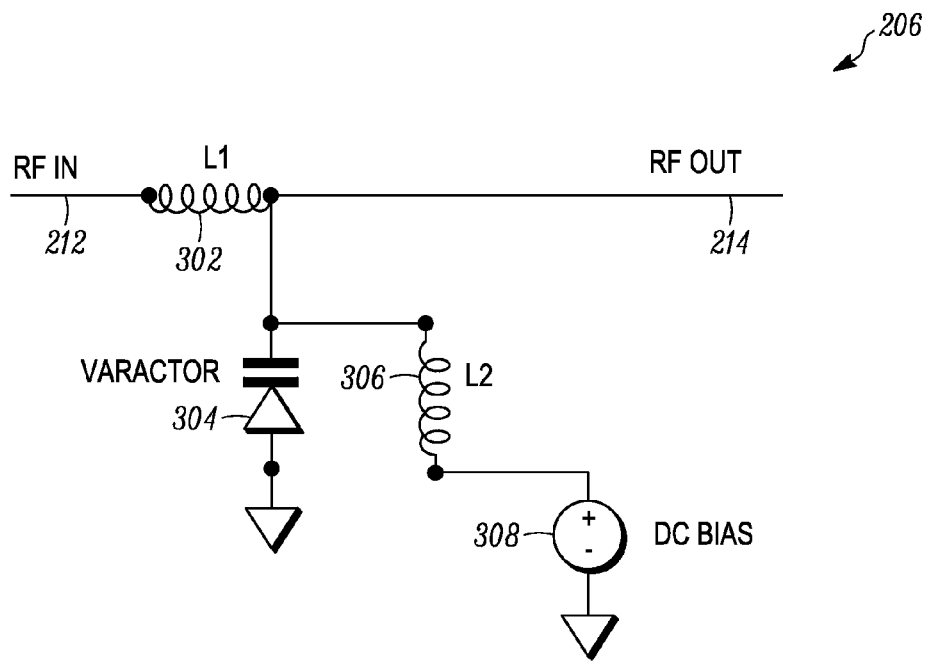
FIG. 3 is a schematic diagram of a conventional dispersion correction circuit.

FIG. 3 is a schematic diagram of conventional dispersion correction circuit 206 as described with reference to FIG. 2 for use in an optical communication system.

Dispersion correction circuit 206 includes an inductor 302, a varactor diode 304, an inductor 306 and a DC bias 308.

Signal 212 as noted as an RF in, connects to a first leg of inductor 302. A second leg of inductor 302 connects to a first leg of varactor diode 304, a first leg of inductor 306 and signal 214 noted as an RF out. A second leg of varactor diode 304 connects to ground. A second leg of inductor 306 to positive leg of DC bias 308. Negative leg of DC bias 308 connects to ground. Further, the polarity of varactor diode 304 can also be flipped depending on the nature of the chirp.

Dispersion correction circuit 206 is used with laser driver circuitry to provide correction. Without dispersion correction circuit 206, an optical transmitter will transmit optical signal over an optical fiber having a significant amount of dispersion. The dispersion interacting with the laser chirp degrades the performance of a communication system using especially a directly modulated laser. Dispersion correction circuit 206 alters the original electrical signal that is used to drive the laser into a modified signal for driving the laser. The modified signal for driving the laser reduces the amount of impact of fiber dispersion on the laser output, thereby improving performance.

Inductor 302 and varactor diode 304 function as a low pass filter. Signal 212 modifies the capacitance of varactor diode 304 and varies the associated delay for the low pass filter. The variable delay provided by the low pass filter provides dispersion correction. Inductor 306 is used to provide DC bias for varactor diode 304 and block Alternating Current (AC) or Radio Frequency (RF) signal. In some cases, an inductor and a varactor diode may be arranged to form an all-pass filter.

In order to achieve the largest amount of dispersion correction, varactor diode 304 is biased near zero volts as varactor diode 304 exhibits the largest amount of variable capacitance per change in voltage when biased near zero volts. However, biasing varactor diode 304 near zero volts incurs some perform degradations. For example, for a large signal swing with the bias near zero volts, the combined signal and DC bias can generate a positive voltage momentarily across varactor diode 304 such that varactor diode 304 is forward biased and conducts an electrical current. Furthermore, forward biasing and conducting electrical current for varactor diode 304 may generate signal distortion and/or noise. To avoid signal distortion and/or noise, varactor diode 304 may be configured further away from zero Volts, however, this reduces the amount of dispersion correction provided which reduces the length available for transmission distance 108. Additionally, the closer varactor diode 304 is biased to zero Volts, the less linear the Voltage to Capacitance relationship which also negatively affects dispersion correction.

FIG. 3 is a schematic diagram of a conventional dispersion correction circuit where biasing a varactor diode close to zero Volts, when a significant dispersion correction is needed, may cause distortion, noise and non-linear operation and biasing varactor diode further away from zero Volts, while reducing distortion, noise and non-linear operation, also reduces the amount of available dispersion correction.

Figure 4:
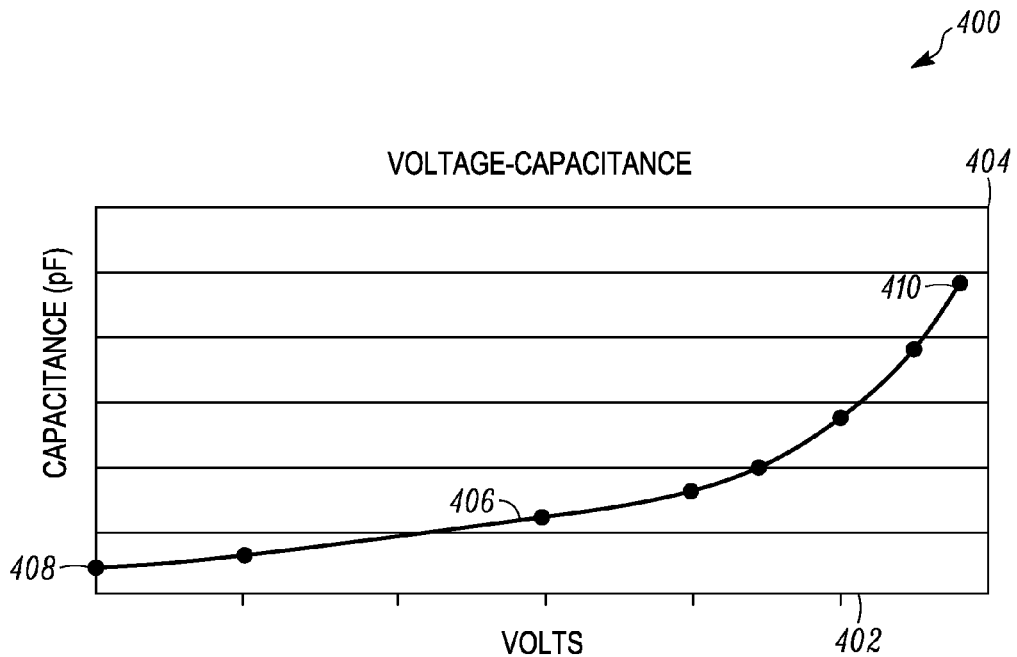
FIG. 4 is a schematic diagram of a conventional Voltage-Capacitance characteristic graph for a varactor diode.

FIG. 4 is a schematic diagram of a conventional Voltage-Capacitance characteristic graph 400 for a varactor diode. Voltage-Capacitance characteristic graph 400 presents Voltage-Capacitance characteristics for a varactor diode configured for a reverse bias.

Voltage-Capacitance characteristic graph 400 includes an x-axis 402 and a y-axis 404. X-axis 402 represents a voltage potential across a varactor diode in units of Volts and y-axis 404 represents the Capacitance exhibited by the varactor diode.

A line 406 initiates at a point 408 and increases exponentially to a point 410.

As illustrated, the capacitance versus voltage for a varactor is non-linear. Due to the non-linear capacitance versus voltage operation of the varactor, configuring a system with consistent operation over a large operating voltage is difficult using a varactor, causing some imperfect dispersion correction. Furthermore, the distance which information may be transferred between transmitter and receiver is restricted due to the limitation of the existing circuit.

As described previously with respect to FIG. 3, the closer the operation of varactor diode 304 is to the x-axis value of zero volts, the greater the amount of capacitance change per change of Voltage is realized which aids in dispersion correction associated with dispersion correction circuit 206. However, the operation of varactor diode 304 close to an x-axis value of zero volts may result in distortion, noise and/or non-linear operation. Furthermore, the closer the operation of varactor diode 304 is to x-axis value of −6 Volts, for example, the less Capacitance change per change in Voltage experienced. Furthermore, the closer the operation to an x-axis value of higher (negative) voltage, the less likelihood for distortion, noise and/or non-linear operation, but the amount of Capacitance change per unit of Voltage is dramatically reduced which reduces the amount of available dispersion correction provided by dispersion correction circuit 206 (FIGS. 2-3).

Embodiments will now be described in detail with reference to FIG. 5.

Figure 5:
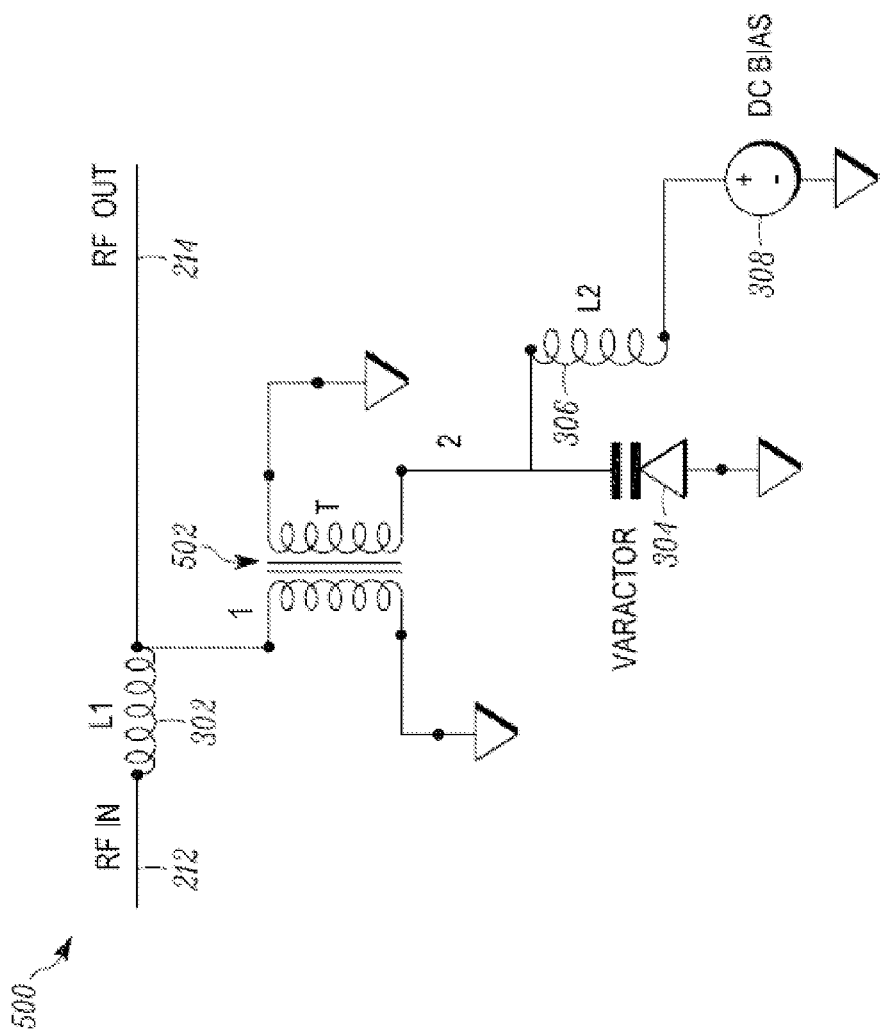
FIG. 5 is a schematic diagram of a dispersion correction circuit, in accordance with an embodiment.

FIG. 5 is a schematic diagram of a dispersion correction circuit 500, in accordance with an embodiment.

Dispersion correction circuit 500 includes inductor 302, varactor diode 304, inductor 306, DC bias 308 and a transformer 502.

Dispersion correction circuit 500 is similar to dispersion correction circuit 206 as described with reference to FIG. 3 with transformer 502 inserted between second leg of inductor 302 and first leg of varactor diode 304/first leg of inductor 306. As a non-limiting example, transformer 502 may be configured as the type transformer as shown in FIG. 5.

Primary side/first leg of transformer 502 connects to second leg of inductor 302 and signal 214. Primary side/second leg of transformer 502 connects to ground. Secondary side/first leg of transformer 502 connects to ground. Secondary side/second leg of transformer 502 connects to first leg of varactor diode 304 and first leg of inductor 306. The legs of the primary side of transformer 502 can be swapped to change the polarity of the signal driving varactor diode 304. Likewise, the legs of secondary side of transformer 502 can also be swapped to change the polarity of the signal driving varactor diode 304.

Dispersion correction circuit 500 improves the Voltage-to-Capacitance slope of a dispersion correction circuit while enabling the varactor diode bias to be configured in the middle of the Voltage-to-Capacitance curve such that an increased slope and linear capacitance variation is achieved. Furthermore, the increased slope and linear capacitance variation is achieved without resulting in positive varactor diode bias.

The following information and associated equations describe how dispersion correction circuit 500 provides improved dispersion correction over conventional approaches.

The capacitance of a varactor diode at any voltage may be expressed by Equation (1) shown below:

$$C(v) = C_{j0}(1 - V/V_{bi})^{-\gamma} = C_{j1}(V_{bi} - V)^{-\gamma} \quad (1)$$

$$\text{where } C_{j1} = C_{j0}(V_{bi})^{-\gamma} \quad (2)$$

The parameter C(v) represents the varactor capacitance with respect to a voltage v. $C_{j0}$ represents the varactor diode capacitance at zero voltage. The parameter $\gamma$ is associated with the doping profile for the varactor diode. As non-limiting examples, $\gamma=0.5$ may represent an abrupt junction and $\gamma=1$ may represent a hyper-abrupt junction.

The group delay for the delay compensating network as described with reference to FIG. 3 may be given by Equation (3):

$$T_{gd} = (L_{402}C(v))^{1/2} \quad (3)$$

Using small signal approximation Equation (4) may be derived as shown below:

$$\delta T_{gd} = \frac{1}{2}\left(\frac{L_{402}}{C(v)}\right)^{1/2} \delta C \quad (4)$$

The coil number ratio between the primary side and secondary side of transformer 502 may be described as Equation (5) shown below:

$$x = \frac{n_1}{n_2} \quad (5)$$

where $n_1$ is the coil number of the primary side 1 of transformer 502 and $n_2$ is the coil number of secondary side 2 of transformer 502 with the constraints as given by Equation (6) shown below:

$$n_1 < n_2 \quad (6)$$

The enhancement provided by dispersion correction circuit 500 is achieved as a result of the impedance on the primary side being converted to $Z2 \ast x^2$. Which results in the capacitance on the primary side being described by Equation (7) below:

$$C'(v) = C(v) \ast x^2 \quad (7)$$

Combining Equations (7) and (4) results in Equation (8) as shown below:

$$\delta T'_{gd} = \frac{1}{2}\left(\frac{L_1}{C(v)}\right)^{1/2} \delta C \ast x \quad (8)$$

Equation (8) can be understood as having the capacitance value and capacitance slope in the converted varactor diode as being enhanced by the factor of $x^2$.

Equation (8) may also be derived via the secondary side of transformer 502. The Voltage is converted as shown by Equation (9) below:

$$V' = v \ast x \quad (9)$$

Combining Equation (9) with Equation (4) yields the same result as Equation (8) using the constraint of $\delta C \propto \delta v$.

From Equation (9) it may be observed the dispersion correction capability is enhanced by a factor of x. This enhancement enables the varactor diode to be biased towards the middle of the original varactor diode Voltage-to-Capacitance curve while not overdriving the varactor diode and achieving improved dispersion correction capability over conventional applications.

Furthermore, x is configured according to the required circuit bandwidth associated with dispersion correction circuit 500.

A cascade concept may also be applied to dispersion correction circuit 500 as where varactor diode 304, inductor 306 and DC bias 308 may be cascaded to an n-order varactors' circuit for improved linearity, decreased dispersion and improved performance.

The circuit illustrated with reference to FIG. 5 is configured for low-pass operation. The improvement associated with linearity as described with reference to FIG. 5 may also be applied to all-pass filters via replacement of inductor 302 with a center-tapped inductor. Furthermore, inductor 302 may also be replaced with two inductors to form the equivalent of a center-tapped inductor.

The anode/cathode orientation of the varactor diodes described with reference to FIG. 5 may be inverted for some embodiments in order to invert correction.

The technique of adding a transformer may be applied to other variations of dispersion correction circuits for achieving improved dispersion correction.

A dispersion correction circuit has been described which inserts a transformer into a dispersion correction circuit which provides improved dispersion correction via biasing the circuit towards the middle of the Voltage-to-Capacitance curve.

The foregoing description of various embodiments has been presented for purposes of illustration and description. It is not intended to be exhaustive or to limit embodiments to the precise forms disclosed, and obviously many modifications and variations are possible in light of the above teaching. It is intended that the scope be defined by the claims appended hereto.

What is claimed is:

1. A dispersion correction circuit for use with an input driving signal, the dispersion correction circuit comprising:
an input portion arranged to receive the input driving signal;
an output portion operable to output an output signal based on the input driving signal; and
a filter portion operatively disposed between the input portion and the output portion,
wherein the filter portion includes a varactor, a DC bias portion, and transformer, wherein the DC bias portion provides a DC bias to the varactor, and wherein the transformer is operatively coupled to the input portion, the output portion, and the varactor such that linear capacitance variation is achieved.

2. The dispersion correction circuit of claim 1, wherein the DC bias portion includes an inductor.

3. The dispersion correction circuit of claim 2, wherein the input portion includes a second inductor.

4. The dispersion correction circuit of claim 3, wherein the transformer is operatively coupled to the inductor, the second inductor, and the varactor.

5. The dispersion correction circuit of claim 1, wherein the input portion includes an inductor.

6. An optical transmission system comprising:
   a driver operable to provide an input driving signal;
   a dispersion correction circuit operable to generate an electrical output signal, the dispersion correction circuit including an input portion, an output portion, and a filter portion; and
   a laser operable to output an optical signal based on the electrical output signal, the input portion arranged to receive the input driving signal; and
   the output portion operable to output an output signal based on the input driving signal,
   wherein the filter portion is operatively disposed between the input portion and the output portion,
   wherein the filter portion includes a varactor, a DC bias portion, and transformer,
   wherein the DC bias portion provides a DC bias to the varactor, and
   wherein the transformer is operatively coupled to the input portion, the output portion, and the varactor such that linear capacitance variation is achieved.

7. The optical transmission system of claim 6, wherein the DC bias portion includes an inductor.

8. The optical transmission system of claim 7, wherein the input portion includes a second inductor.

9. The optical transmission system of claim 8, wherein the transformer is operatively coupled to the inductor, the second inductor, and the varactor.

10. The optical transmission system of claim 6, wherein the input portion includes an inductor.

11. A method of compensating for dispersion associated with an input driving signal, the method comprising:
    receiving, via an input portion, the input driving signal;
    filtering, via a filter portion, the input driving signal;
    outputting, via an output portion, an output signal based on the filtered input driving signal; and
    wherein the filter portion includes a varactor, a DC bias portion, and transformer,
    wherein the DC bias portion provides a DC bias to the varactor, and
    wherein the transformer is operatively coupled to the input portion, the output portion, and the varactor such that linear capacitance variation is achieved.

12. The method of claim 11, wherein the filtering, via a filter portion, the input driving signal comprises:
    filtering with the DC bias portion, wherein the DC bias portion includes an inductor.

13. The method of claim 12, wherein the receiving, via the input portion, the input driving signal comprises:
    receiving the input driving signal via the input portion, wherein the input portion includes a second inductor.

14. The method of claim 13, wherein the transformer is operatively coupled to the inductor, the second inductor, and the varactor.

15. The method of claim 11, wherein the receiving, via the input portion, the input driving signal comprises:
    receiving the input driving signal via the input portion, wherein the input portion includes an inductor.

* * * * *